United States Patent
Esman et al.

(10) Patent No.: US 11,982,922 B1
(45) Date of Patent: May 14, 2024

(54) POLARIZATION MAINTAINING PARAMETRIC OPTICAL FREQUENCY COMB GENERATOR

(71) Applicant: Rockwell Collins, Inc., Cedar Rapids, IA (US)

(72) Inventors: Daniel J. Esman, Ellicott City, MD (US); Ronald D. Esman, Mclean, VA (US); Mark A. Laliberte, Reston, VA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/986,373

(22) Filed: Nov. 14, 2022

(51) Int. Cl.
*G02F 1/35* (2006.01)
*G02F 1/365* (2006.01)

(52) U.S. Cl.
CPC ............ *G02F 1/3503* (2021.01); *G02F 1/365* (2013.01)

(58) Field of Classification Search
CPC ................................. G02F 1/3503; G02F 1/365
See application file for complete search history.

(56) References Cited

U.S. PATENT DOCUMENTS

| | | | |
|---|---|---|---|
| 5,303,314 A | 4/1994 | Duling, III et al. | |
| 6,201,638 B1 | 3/2001 | Hall et al. | |
| 6,775,447 B2 * | 8/2004 | Nicholson | G02B 6/29377 372/21 |
| 7,551,342 B2 | 6/2009 | Kourogi et al. | |
| 8,275,263 B1 | 9/2012 | Franklin | |
| 8,447,155 B1 | 5/2013 | Kuo et al. | |
| 9,106,325 B2 * | 8/2015 | Ataie | H04B 10/00 |
| 9,287,993 B1 | 3/2016 | Adleman et al. | |
| 10,348,411 B2 | 7/2019 | Alic et al. | |
| 10,411,810 B2 | 9/2019 | Kuo et al. | |
| 10,523,329 B2 | 12/2019 | Esman et al. | |
| 10,763,971 B2 | 9/2020 | Esman et al. | |
| 2008/0232406 A1 | 9/2008 | Nicholson et al. | |
| 2009/0016669 A1 * | 1/2009 | Oguri | G02F 1/365 385/11 |
| 2014/0178020 A1 | 6/2014 | Kuo et al. | |

(Continued)

FOREIGN PATENT DOCUMENTS

| | | | | |
|---|---|---|---|---|
| CN | 108879302 A | * | 11/2018 | ......... H01S 3/06716 |
| EP | 1962135 A1 | | 8/2008 | |
| WO | 2021194630 A3 | | 1/2022 | |

OTHER PUBLICATIONS

European Search Report dated Mar. 15, 2024; European Application No. 23209077.9.

(Continued)

*Primary Examiner* — Daniel Petkovsek
(74) *Attorney, Agent, or Firm* — Suiter Swantz IP

(57) ABSTRACT

A system is described. The system includes HNLF for generating an optical frequency comb and a single mode fiber for reducing a pulse duration of comb. The system includes a FRM to reflect the light in back propagation through the HNLF and the single mode fiber. Perturbations in a state of polarization caused by the HNLF and the single mode fiber are cancelled between the forward propagation and the backward propagation. The optical frequency comb may then be polarization maintaining without an active component such as a polarization controller and a feedback circuit.

18 Claims, 11 Drawing Sheets

(56) References Cited

U.S. PATENT DOCUMENTS

2019/0339548 A1   11/2019   Ataie
2021/0328669 A1   10/2021   Esman et al.

OTHER PUBLICATIONS

Zhao Wei et al.: "Femtosecond-Pulse Fiber Based Amplification Techniques and Their Applications", IEEE Journal of Selected Topics in Quantum Electronics, IEEE, USA., vol. 20, No. 1, Sep. 1, 2014, pp. 1-13.

* cited by examiner

POLARIZATION MAINTAINING PARAMETRIC OPTICAL FREQUENCY COMB GENERATOR

TECHNICAL FIELD

The present invention generally relates to optical waveguides (e.g., fibers), and more specifically to optical fibers for generating an optical frequency comb.

BACKGROUND

Many photonic system applications benefit from the stability of polarization maintaining (PM) fiber. As an example, signal and local oscillator (LO) fields must have the same polarization for a single polarization optical coherent receiver. Maintaining the signal and local oscillator fields with the same polarization is difficult with non-PM waveguides due to environmental effects changing the state of polarization (SOP).

Research in parametric fiber based optical frequency comb (OFC) technologies offer promising photonic applications to ultrawideband radio frequency (RF) signal capturing and processing. However, no polarization maintaining parametric OFC suitable for generating optical frequency combs exists. Therefore, it would be advantageous to provide a device, system, and method that cures the shortcomings described above.

SUMMARY

A system is described, in accordance with one or more embodiments of the present disclosure. In some embodiments, the system includes an optical generator configured to generate light. In some embodiments, the light comprises a first polarization. In some embodiments, the first polarization is one of a vertical polarization or a horizontal polarization. In some embodiments, the system includes a first polarization beam splitter (PBS) coupled to the optical generator. In some embodiments, the system includes a first highly nonlinear fiber (HNLF) coupled to the first PBS. In some embodiments, the first HNLF induces self-phase modulation to the light. In some embodiments, the system includes a first single mode fiber (SMF) coupled to the first HNLF. In some embodiments, the first SMF causes pulse compression of the light. In some embodiments, the system includes a first Faraday rotator mirror (FRM) coupled to the first SMF. In some embodiments, the first HNLF and the first SMF are non-polarization maintaining (PM) fiber. In some embodiments, the light is configured to forward propagate from the first PBS through the first HNLF and the first SMF, reflect from the first FRM, and back propagate through the first SMF and the first HNLF to the first PBS. In some embodiments, the first FRM causes the polarization of the light immediately after reflecting from the first FRM to be orthogonal to the polarization of the light immediately before reflecting from the first FRM. In some embodiments, the first PBS is configured to output an optical frequency comb (OFC) from a third port of the PBS. In some embodiments, the OFC is polarization maintaining.

BRIEF DESCRIPTION OF THE DRAWINGS

Implementations of the concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF THE INVENTION

Figure 1:
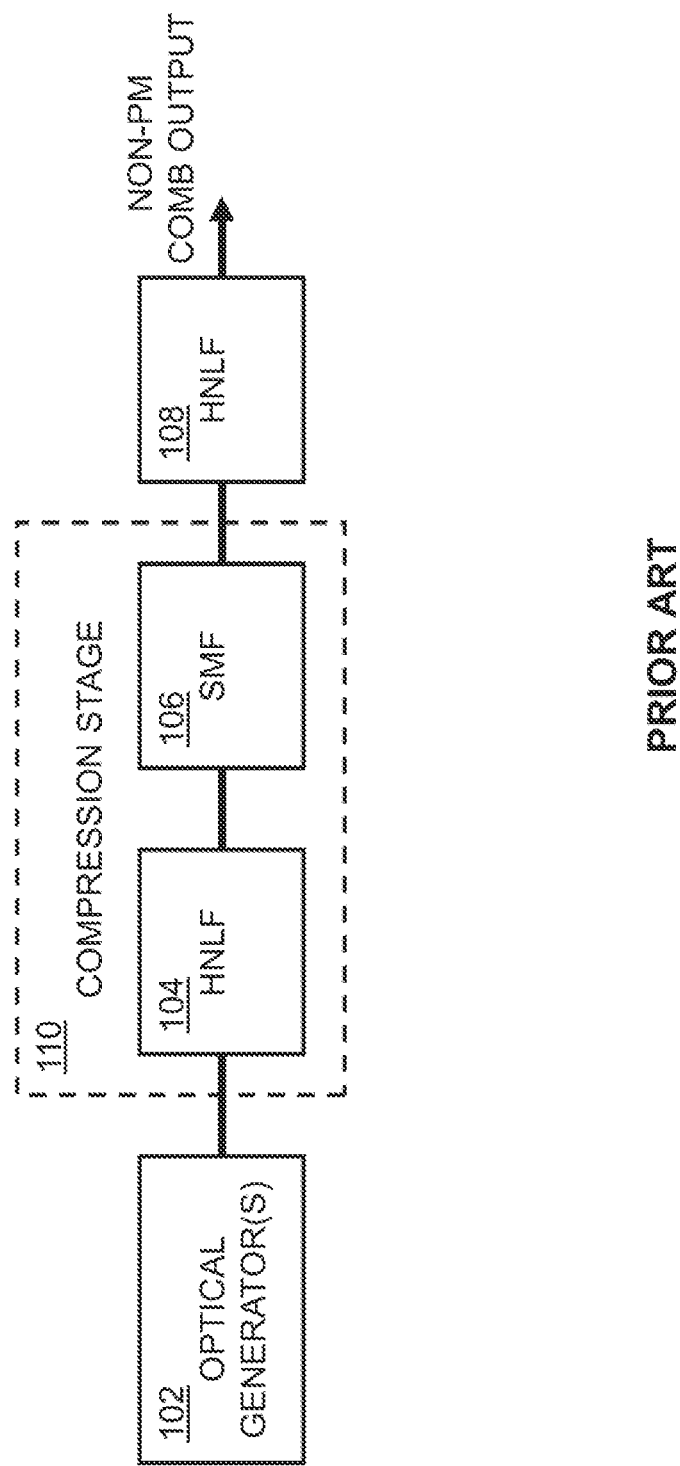
FIG. 1 depicts a simplified block diagram of a system, in accordance with the prior art.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details are set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a"

and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

U.S. Patent Publication No. US 2014/0178020A1, titled "Methods and Apparatus For Power-Equalized Optical Frequency Comb Generation", naming Ping Piu Kuo et al. as inventors, and filed on May 3, 2013; and U.S. Pat. No. 5,303,314, titled "Method and apparatus for polarization-maintaining fiber optical amplification with orthogonal polarization output", naming Irl N. Duling, III et al. as inventors, and filed on Mar. 15, 1993; are each incorporated herein by reference in the entirety.

Reference will now be made in detail to the subject matter disclosed, which is illustrated in the accompanying drawings.

Referring now to FIG. 1, a system 100 is described, in accordance with the prior art. The system 100 may generate a parametric comb. The system 100 may include an optical generator 102, a compression stage 110, and an HNLF 108 (highly nonlinear fiber). The compression stage 110 may include one or more of an HNLF 104 and an SMF 106 (single mode fiber).

The light from the optical generator 102 is sent to the compression stage 110. In the compression stage 110, the HNLF 108 is used to attain phase matching condition for self-phase modulation (SPM). The HNLF 108 may be referred to as a first nonlinear stage with low dispersion. In the compression stage 110, the SMF 106 converts the largely quadratic phase from the SPM to linear phase and converts the optical field into transform-limited pulses. The SMF 106 may be referred to as a linear stage with appropriate chromatic dispersion for converting the largely quadratic phase from the SPM to linear phase. The compression stage 110 may be repeated multiple times for further pulse compression. The transform-limited high peak power pulses from the SMF 106 are then sent to an HNLF 108. The HNLF 108 includes low, normal dispersion used for wideband frequency comb generation. The system 100 may thus be a fiber-based system used to generate a parametric comb. The fiber based parametric combs have a non-PM output. Providing light into non-polarization maintaining (non-PM) fibers like the HNLF and SMF cause the light output to be at a random polarization. Additionally, the state of polarization may change with vibration and temperature through the HNLF and SMF.

One method to generate a PM OFC output from the non-PM OFC output is to use a polarization controller, a photodetector, and a feedback circuit (not depicted). The undesired polarization may be sent to the photodetector. The photodetector may generate a polarization error signal used by the feedback circuit. The feedback circuit may minimize power and control the polarization controller to maintain the polarization out on a single fiber. However, the use of the polarization controller, the photodetector, and the feedback circuit may include one or more drawbacks. For example, the polarization controller, the photodetector, and/or the feedback circuit may add a number of components which have higher overall optical loss, higher complexity, and/or higher size, weight, power and cost (SWaP-C). By way of another example, the polarization controller, the photodetector, and/or the feedback circuit may require the use of active electronic components. By way of another example, the polarization controller, the photodetector, and/or the feedback circuit may limit the polarization stability due to speed and/or accuracy depending upon the environment.

Referring generally to FIGS. 2-9. Embodiments of the present disclosure are directed to generating a polarization maintaining (PM) parametric optical frequency comb (OFC). The non-polarization maintaining (non-PM) fiber in a parametric comb may be converted into a polarization stable output utilizing a Faraday Rotator Mirror (FRM) and symmetry in a schematic of the optical circuit. Light traverses in a forward direction half the length of the non-PM fiber before hitting an FRM, which reflects the light backward through the same fiber but in orthogonal polarization. Any perturbations or evolution of the state of polarization (SOP) of the fiber are canceled due to the orthogonal polarization and backward propagation. A polarization beam splitter (PBS) at the input may be used to decouple the vertical and horizontal polarizations. The optical circuit results in a stable polarization maintaining output, even when using non-PM optical fiber to generate the comb. Thus, a polarization maintaining optical frequency comb (PM OFC) may be generated utilizing a passive approach.

Figure 2:
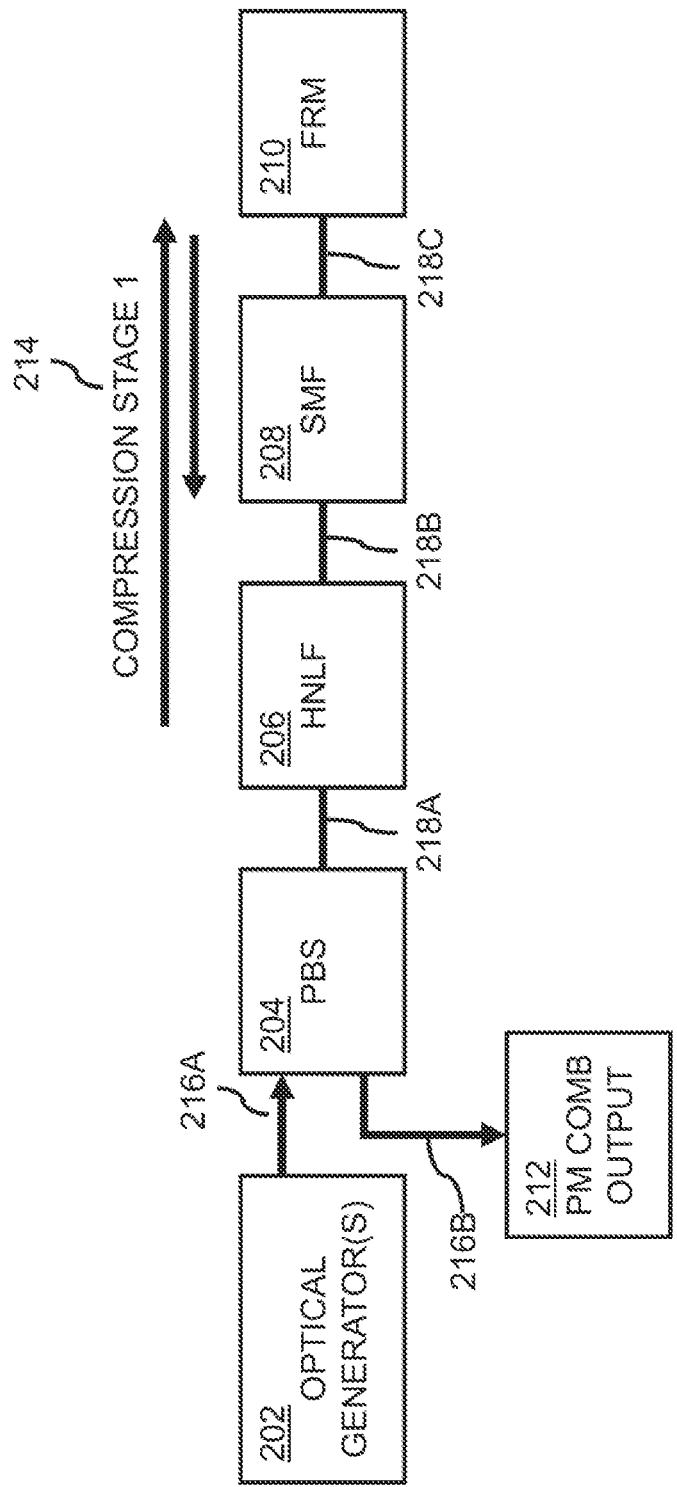
FIG. 2 depicts a simplified block diagram of a system, in accordance with one or more embodiments of the present disclosure.

FIG. 2 depicts a system 200 in accordance with one or more embodiments of the present disclosure. The system 200 may include one or more of an optical generator 202, a PBS 204, an HNLF 206, an SMF 208, and an FRM 210.

The optical generator 202 may include an optical generator configured to generate at least two input optical waves. The optical generator 202 may include two continuous wave (CW) lasers at known frequency separation, one CW laser in series with one or more electro-optic (E-O) modulators to generate multiple wavelengths, or a mode-locked laser (MLL), and the like. The at least two input optical waves may each include a polarization. The polarization may include a vertical polarization or a horizontal polarization, but all input optical waves will include the same polarization (or considered the same). In embodiments, the input polarization may be vertical, although this is not intended to be limiting. The at least two input optical waves generated by the optical generator 202 may then be provided to the PBS 204. The optical waves may include a wavelength from 800 nanometers to 2 microns (e.g., 374.74 THz to 149.89 THz). Similarly, the optical waves may include a frequency between 150 THz to 375 THz. The optical waves may also be referred to as input light.

The PBS 204 may also be referred to as a polarization beam combiner (PBC) and/or a circulator. The PBS 204 may split the polarization so the vertical polarization comes out one fiber and the horizontal polarization comes out another fiber. The PBS 204 may include three ports. A first port of the PBS 204 may be coupled to the optical generator 202 for receiving the at least two input optical waves. The first port of the PBS 204 may be coupled to the optical generator 202 by a PM fiber 216A. A second port of the PBS 204 may be coupled to the HNLF 206. The second port of the PBS 204 may be coupled to the HNLF 206 for outputting the at least two input optical waves to the HNLF 206. The second port of the PBS 204 may then receive backward propagating light reflected from the FRM 210 by the coupling with the HNLF 206. The second port of the PBS 204 may be coupled to the HNLF 206 by an SMF 218A. A third port of the PBS 204 may provide an output of the PM OFC to one or more additional devices or fibers (not depicted). The third port of the PBS 204 may be coupled to the additional device or fibers by the PM fiber 216B.

In some embodiments, the PBS 204 may include a polarization maintaining to single mode (PM to SM) fused fiber polarization combiner. For example, the PBS 204 may include the first port which is configured to couple to the PM fiber 216A, the second port which is configured to couple to the SMF 218A, and the third port which is configured to couple to the PM fiber 216B.

In some embodiments, the PBS 204 may include a center wavelength and a bandwidth. The PBS 204 may include a center wavelength such as, but not limited to, 850 nanometers, 1300 nanometers, 1550 nanometers, and the like. In one example, the PBS 204 includes a center wavelength of 1550 nm and a bandwidth of ±15 nm.

The HNLF 206 may refer to an optical fiber having a nonlinear optical response. The HNLF 206 may refer to an optical fiber having a high nonlinear coefficient. The HNLF 206 may exhibit strong optical nonlinearities when compared to standard optical fiber. The nonlinear coefficient of the HNLF 206 may be on the order of 10 to 30 $W^{-1}*km^{-1}$. The HNLF 206 may also include a relatively low dispersion slope. For example, the HNLF 206 may also include a dispersion slope between zero and 0.020 $ps/(nm^2*km)$. For instance, the HNLF 206 may include a zero-slope HNLF at a wavelength of 1550 nm. The HNLF 206 may include a length, such as, but not limited to, between 1 cm and 1 km. In some embodiments, the HNLF 206 may include a length between 50 and 150 meters, although this is not intended to be limiting.

The HNLF 206 may be coupled to the PBS 204 and/or the SMF 208. As depicted, the HNLF 206 is coupled between the PBS 204 and the SMF 208. The HNLF 206 may be coupled to the PBS 204 by the SMF 218A. The HNLF 206 may be coupled to the SMF 208 by the SMF 218B. The HNLF 206 may receive light from the PBS 204 and pass the light to the SMF 208 in forward propagation. Similarly, the HNLF 206 may receive light from the SMF 208 and pass the light to the PBS 204 in backward propagation after the light reflects from the FRM 210.

In some embodiments, the HNLF 206 may be single mode HNLF. The single mode HNLF 206 may be non-polarization maintaining. The HNLF 206 may then induce self-phase modulation or a frequency chirp into the light passing through the HNLF 206. The nonlinear nature of the HNLF 206 in the time domain and/or self-phase modulation may create frequency chirp due to the Kerr effect. The self-phase modulation or frequency chirp may be referred to as nonlinear spectral broadening. The self-phase modulation or frequency chirp may be based on the amount of power and/or the length of the HNLF 206.

The SMF 208 may refer to an optical fiber having a single mode. SMF may refer to a fiber configured to carry a transverse mode of light. The SMF 208 may exhibit weak optical nonlinearities when compared to the HNLF 206. The nonlinear coefficient of the SMF 208 may be on the order of 0.6 to 1 $W^{-1}*km^{-1}$.

The SMF 208 may be coupled to the HNLF 206 and/or the FRM 210. As depicted, the SMF 208 is coupled between the HNLF 206 and the FRM 210. The SMF 208 may be coupled to the HNLF 206 by the SMF 218B. The SMF 208 may be coupled to the FRM 210 by the SMF 218C. The SMF 208 may receive light from the HNLF 206 and pass the light to the FRM 210 in forward propagation. Similarly, the SMF 208 may receive light from the FRM and pass the light to the HNLF 206 in backward propagation after the light reflects from the FRM 210.

The SMF 208 may include a dispersion value. The dispersion value may also be referred to as a chromatic dispersion value. The SMF 208 may then disperse the light based on the dispersion value. The dispersion of the light may cause the duration of the frequency chirps introduced by the HNLF 206 to be reduced. The SMF 208 may be configured to compress the light (e.g., reduce pulse duration) based on the dispersion value. The dispersion value of the SMF 208 may be relatively high when compared to the HNLF 206. The SMF 208 may include a range of dispersion values, such as, but not limited to, between 18 and 22 ps/(nm*km) at 1550 nm. The length of the SMF 208 may be selected based upon an optical power. For example, the length of the SMF 208 may be between 300 and 600 meters.

The FRM 210 may be a passive mirror with a Faraday rotator element. The FRM 210 may compensate for state of polarization (SOP) variations in the HNLF 206 and/or the SMF 208. The FRM 210 may be coupled to the SMF 208. The FRM 210 may be coupled to the SMF 208 by the SMF 218C. The FRM 210 may receive light from the SMF 208 and reflect the light backward to the SMF with an orthogonal polarization. Orthogonal polarization may refer to the FRM 210 rotating the output polarization by 90 degrees relative to the input polarization. Orthogonal polarization may refer to the FRM 210 having a slight difference in the phase velocity between the left and right circular polarizations.

In embodiments, the forward propagation of light through the HNLF 206, the forward propagation of light through the SMF 208, and the backward propagation of light through the SMF 208 may be considered a first compression stage 214.

The backward propagation of light through the HNLF 206 and the backward propagation of light through the PBS 204 may generate a polarization maintaining optical frequency comb 212. The PM OFC 212 may be generated by the self-phase modulation. The PM OFC 212 may include a polarization which is orthogonal to the input light from the optical generator 202. For example, the input light from the PM OFC 212 may include a vertical polarization and the polarization maintaining optical frequency comb 212 may include a horizontal polarization. In embodiments, the optical frequency comb may be a parametric comb. The parametric comb may refer to an optical source that generates many optical continuous wave (CW) carriers (aka comb tones) that are phase coherent. The comb tones being phase coherent may mean that if the comb tones are mixed the resultant signal would have very small phase noise. The comb source may appear as numerous vertical lines (tones) like a hair comb on an optical spectrum analyzer.

A path of the light is now described. The light travels from the optical generator 202 through polarization maintaining fiber 216A through the PBS 204, through the HNLF 206, through the SMF 208, reflects off the FRM 210, through the SMF 208, through the HNLF 206, and through the PBS 204 to the polarization maintaining fiber 216B. Because of the Faraday rotation, the returning light is orthogonal to the input light and is fed out of the orthogonal port of the PBS 204. For example, if the input light has a vertical polarization, then the output light has a horizontal polarization.

In embodiments, the light traverses through the HNLF 206 and the SMF 208 twice. Traversing twice through the HNLF 206 and the SMF 208 may allow the system 100 to achieve the PM OFC 212 with half of the length of fiber when compared to the fibers in the system 100 used to generate the non-polarization maintaining optical frequency comb. In this regard, the length of the HNLF 206 may be between 50 and 150 meters and the length of the SMF 208 may be between 150 and 300 meters. Additionally, the return trip of light through the HNLF 206 may allow for generating the tones in the PM OFC 212 without requiring an additional HNLF stage.

The FRM 210 causes a polarization of the light immediately after reflecting from the FRM 210 to be orthogonal to a polarization of the light immediately before reflecting from the first FRM 210. The state of polarization (SOP) of forward propagating light in the HNLF 206 and the SMF 208 is then always orthogonal to the state of polarization of backward propagating light in the HNLF 206 and the SMF 208 due to the FRM 210. The counter-propagating state of polarization is orthogonal no matter the state of birefringence or due to perturbations in the state of polarization along the fiber length, so long as those perturbations occur on time scales much greater than the round-trip time. The perturbations may be due to environmental factors such as stress, bending, temperature, and the like. These environmental effects are relatively slow, taking milliseconds or more, which is much greater than the optical round-trip time (PBS 204 to FRM 210 and return to PBS 204). In one example, the optical round-trip time is approximately 2.25 microseconds (e.g., 450 meters/speed of light in fiber=2.25 microseconds). In this regard, the environmental factors are on the order of milliseconds or more which is much greater than the optical round-trip time which are on the order of microseconds. The perturbation in a state of polarization caused by the HNLF 206 and/or the SMF 208 is cancelled between the forward propagation and the backward propagation. In this regard, perturbations in the state of polarization that are caused by the various fibers are reversed during the return trip, effectively canceling the perturbations. The Faraday rotation allows the use of the PBS 204 to launch and separate the forward and backward propagating light, respectively.

Each of the PBS 204, the HNLF 206, the SMF 208, and the FRM 210 may be passive components. Advantageously, the polarization maintaining optical frequency comb 212 may be generated using passive components and without a polarization controller.

In embodiments, the system 200 may include one or more additional compression stages, as will be described further herein. The system 200 may include any number of compression stages, such as, but not limited to, one compression stage, two compression stages, three compression stages, four compression stages, or more. The number of compression stages may be selected to achieve the desired performance for the PM OFC 212. For example, the additional compression stages may include a second compression stage 820 and/or a third compression stage 904. Although not depicted, the second compression stage 820 and/or a third compression stage 904 may be repeated as desired to achieve the desired PM OFC.

Figure 3:
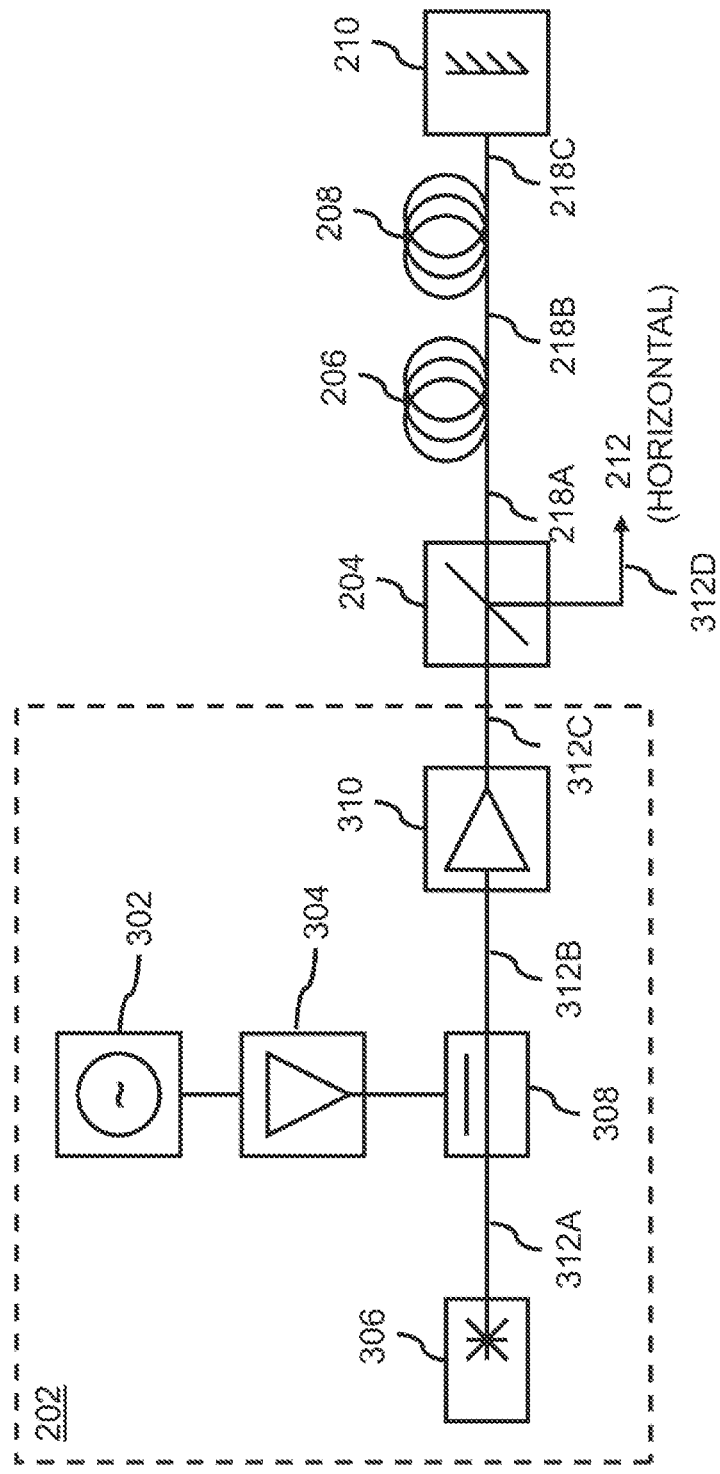
FIG. 3 depicts a schematic diagram of a system, in accordance with one or more embodiments of the present disclosure.
Figure 4A:
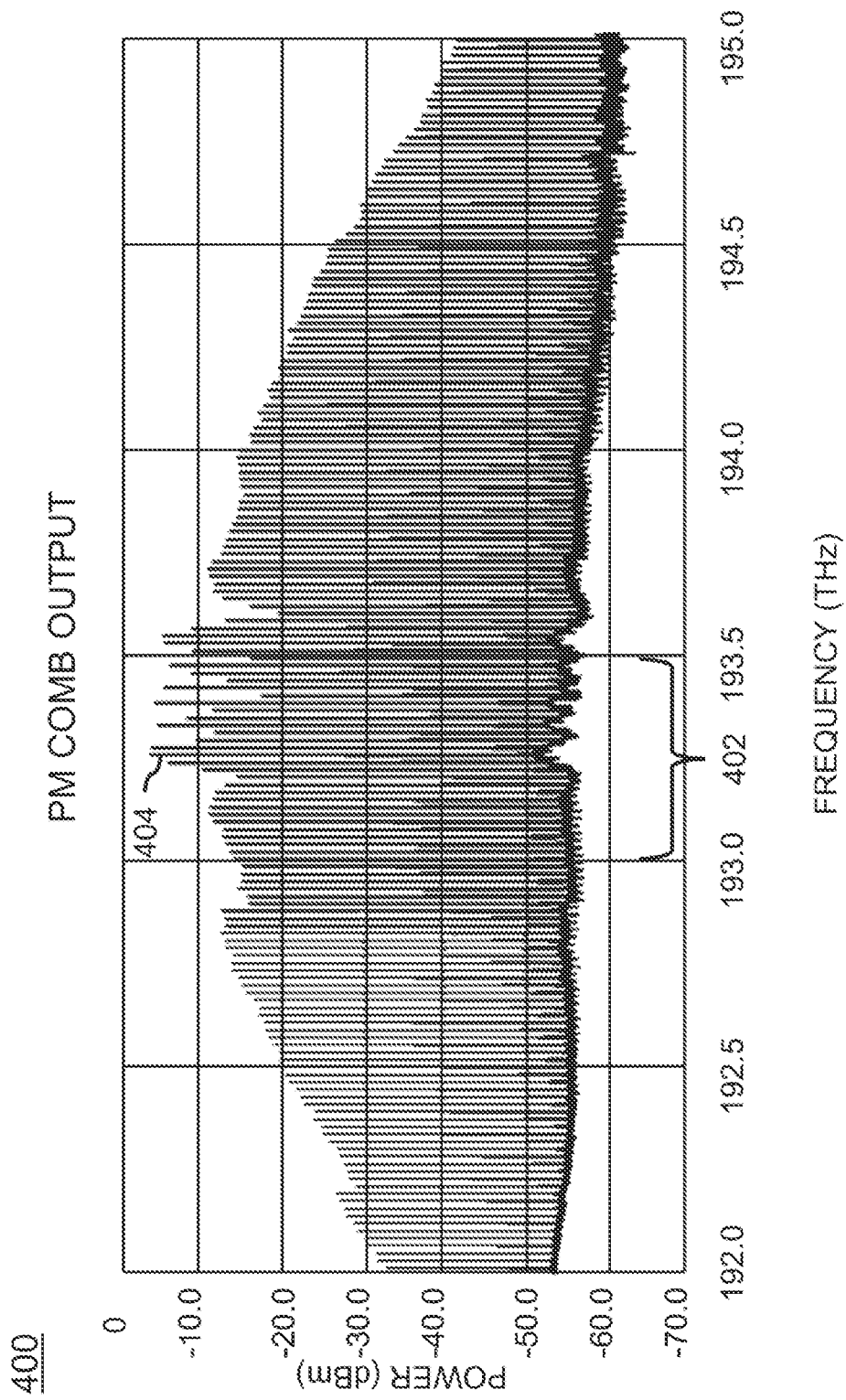
FIGS. 4A-4B depict a graph of a polarization maintaining comb output of a system, in accordance with one or more embodiments of the present disclosure.
Figure 4B:
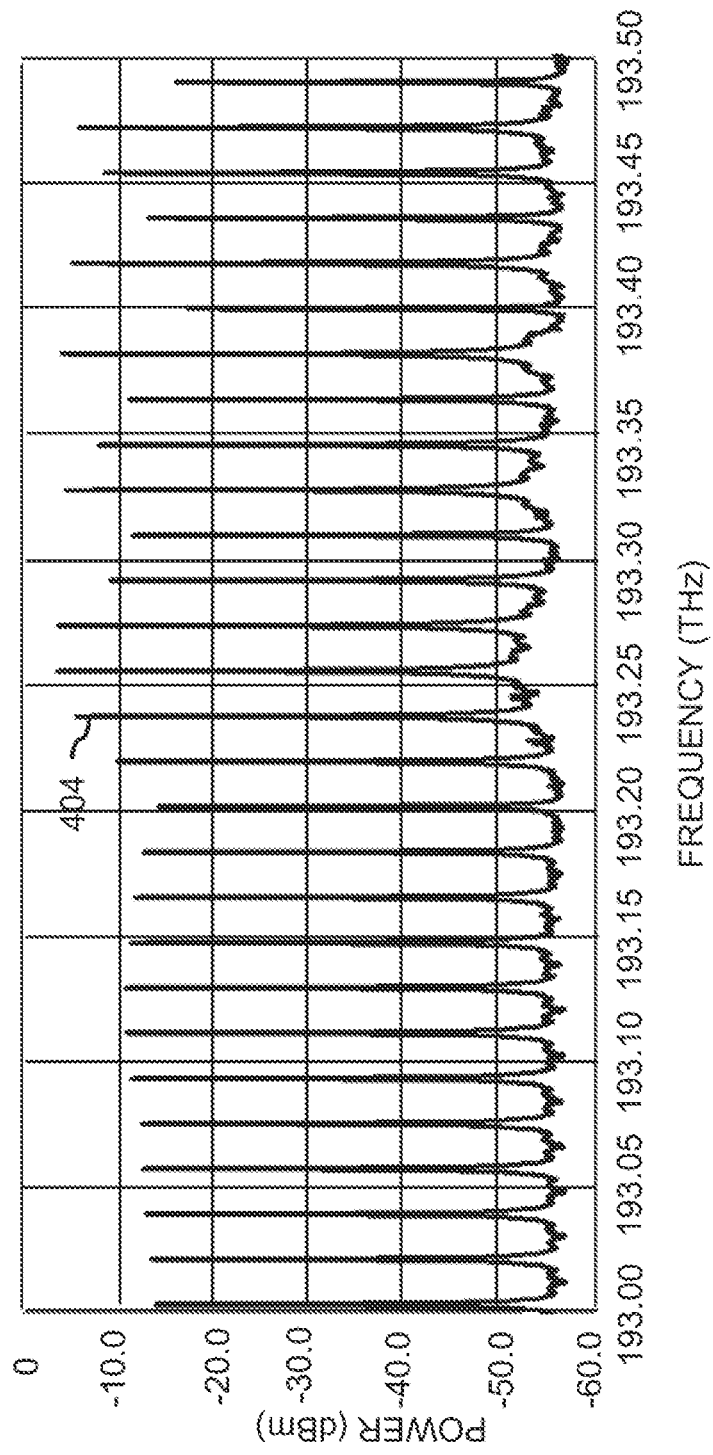

Referring now to FIG. 3, a schematic diagram of a system 300 is described, in accordance with one or more embodiments of the present disclosure. The system 300 may be similar to the system 200. In embodiments, the optical generator 202 may include a radio frequency signal generator 302, a radio frequency amplifier 304, a tunable laser 306, a phase modulator 308, a polarization maintaining optical amplifier 310, polarization maintaining fibers 312 (e.g., a PM fibers 312A-312D), and the like.

The radio frequency signal (RF) generator 302 may be configured to generate an RF signal. The RF signal may include any desired RF signal depending upon the application of the system 300.

The RF amplifier 304 may be coupled to the RF signal generator 302. The RF amplifier 304 may include an amplifier configured to amplify the RF signal from the RF signal generator 302.

The tunable laser 306 may be tunable with an output power, a relative noise intensity (RIN), a linewidth, and/or a frequency set. The tunable laser 306 may be a continuous wave (CW) laser.

The phase modulator 308 may be coupled to the RF amplifier 304 and the tunable laser 306. For example, the phase modulator 308 may include an RF input port for coupling to the RF amplifier 304. By way of another example, the phase modulator 308 may include a fiber input port for coupling to the tunable laser 306. In the example depicted, the phase modulator 308 is coupled to the tunable laser 306 by way of the polarization maintaining fiber 312A. The phase modulator 308 may be an electro-optic phase modulator. The phase modulator 308 may be configured to adjust a phase of the light received from the tunable laser 306 based on the RF signal received from the radio frequency amplifier 304. In embodiments, the phase modulator 308 may phase modulate the laser to generate sidebands.

The PM optical amplifier 310 may be coupled to the phase modulator. In the example depicted, the PM optical amplifier 310 is coupled to the phase modulator 308 by the PM fiber 312B. The PM optical amplifier 310 may then receive the light output by the phase modulator 308 and amplify the light. The PM optical amplifier 310 may include any PM fiber amplifier, such as, but not limited to, Erbium Ytterbium Doped Fiber Amplifier (EYDFA), and the like. The PM optical amplifier 310 may include an input power, an output power, a pump current, and the like. The PM optical amplifier 310 may then be coupled to the PBS 204. In the example depicted, the PM optical amplifier 310 is coupled to the PBS 204 by the PM fiber 312C. The PM fiber 312C may also be referred to as the PM fiber 216A.

The PBS 204 may then receive the at least two co-polarized input optical waves from the PM optical amplifier 310. Either a horizontal polarization port or a vertical polarization port of the PBS 204 is coupled to the PM optical amplifier 310 by way of the PM fiber 312C. In the example depicted, the vertical polarization port of the PBS 204 is coupled to the PM optical amplifier 310 by way of the PM fiber 312C such that the PBS 204 may receive light having a vertical polarization. The at least two input optical waves may then travel through the HNLF 206 and the SMF 208 and then reflect back orthogonally from the FRM 210 as described in more detail in FIG. 2. Either the horizontal polarization port or the vertical polarization port of the PBS 204 may then be coupled to a PM fiber 312D. The PM fiber 312D may also be referred to as the PM fiber 216B. The PM fiber 312D may carry the PM OFC 212 to one or more subsequent devices (not depicted). In the example depicted, the horizontal polarization port of the PBS 204 is coupled to the PM fiber 312D for carrying the PM OFC 212 having a horizontal polarization.

An experimental proof of concept of the system 300 was performed. The parameters for the experimental proof of concept are now described. As may be understood, the parameters described are not intended to be limiting but are one example of a configuration of the system 200 and/or the system 300 which may provide the PM OFC 212.

The radio frequency signal generator 302 included a frequency set at 18 GHz and an output power set at −1.6 dBm (approximately 0.691 milliwatts of output power).

The radio frequency amplifier 304 included a gain of 33.78 dB at 18 GHz (e.g., an output power of approximately 1.6 Watts).

The tunable laser 306 included an output power of +12.5 dBm, a relative noise intensity (RIN) of −145 dB/Hz, a linewidth of 10 kHz, and a frequency set of 193.400 THz.

The phase modulator 308 included an insertion loss (IL) of 4.0 dB and a modulation port (Vπ) of 4.1 Volts at 1 GHz.

The PM optical amplifier 310 included an EYDFA with an input power of +7.0 dBm, an output power of +30 dBm, and a pump current of 2031 mA.

The PBS 204 included a fused fiber polarization combiner with a center wavelength of 1550 nm, a bandwidth of 15 nm, an insertion loss of 0.6 dB for both a slow axis and a fast axis of the fused fiber polarization combiner.

The HNLF 206 included a nonlinear coefficient of 11.0 $W^{-1}*km^{-1}$, a fiber length of 85 meters, a dispersion of −0.85 ps/(nm*km) at 1550 nm, and a dispersion slope of 0.005 $ps/nm^2$/km at 1550 nm.

The SMF 208 included a length of 200 meters, a dispersion of 18 ps/(nm*km) at 1550 nm, and an attenuation of between 0.20 and 0.22 dB/km at a wavelength of 1550 nm.

The FRM 210 included an inline FRM with an insertion loss of 0.6 dB at 1550 nm.

Experimental results from the proof of concept performed using the various parameters above will be described further herein in FIGS. 4A-7.

Figure 5A:
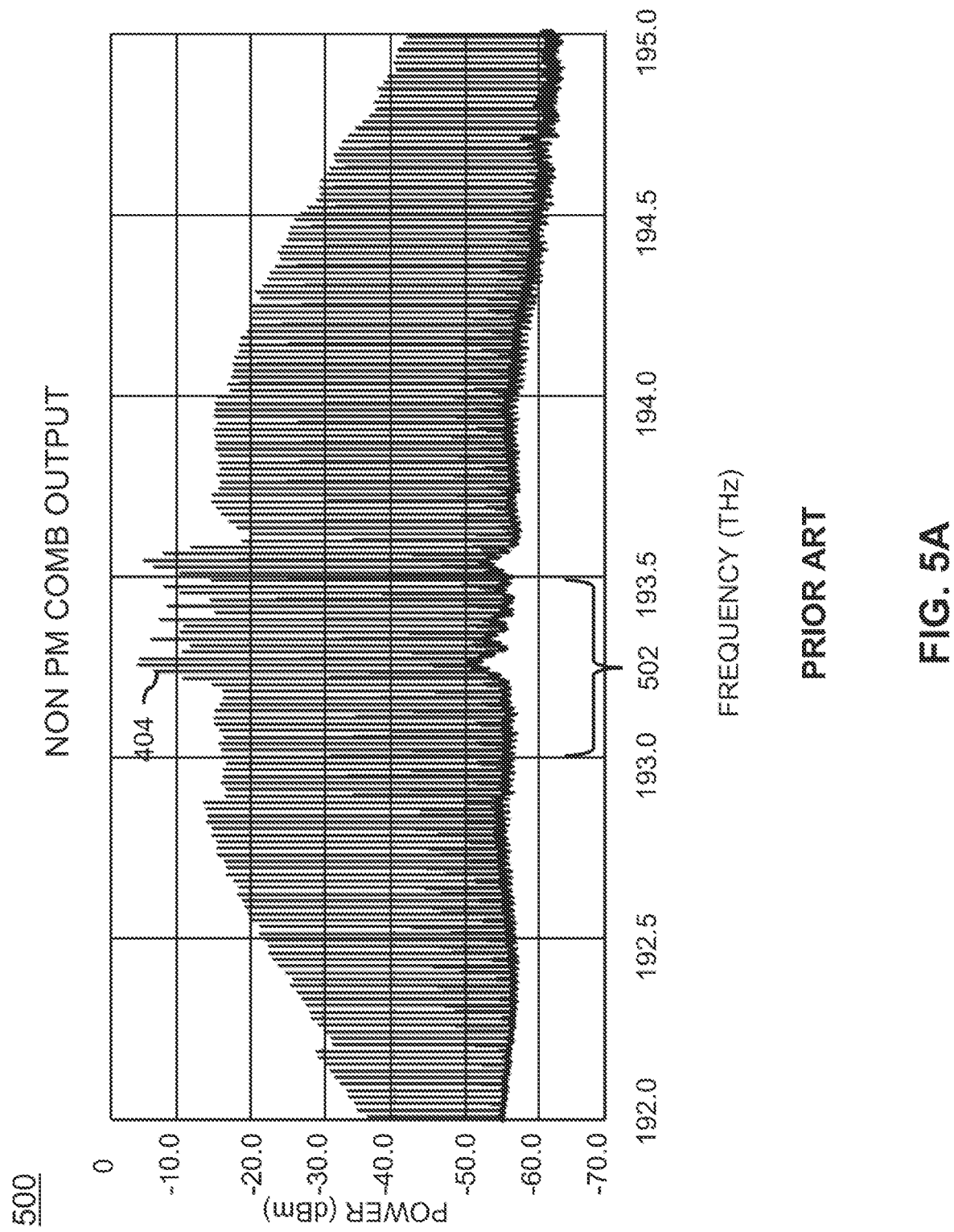
FIGS. 5A-5B depict a graph of a non-polarization maintaining comb output of a system, in accordance with the prior art.
Figure 5B:
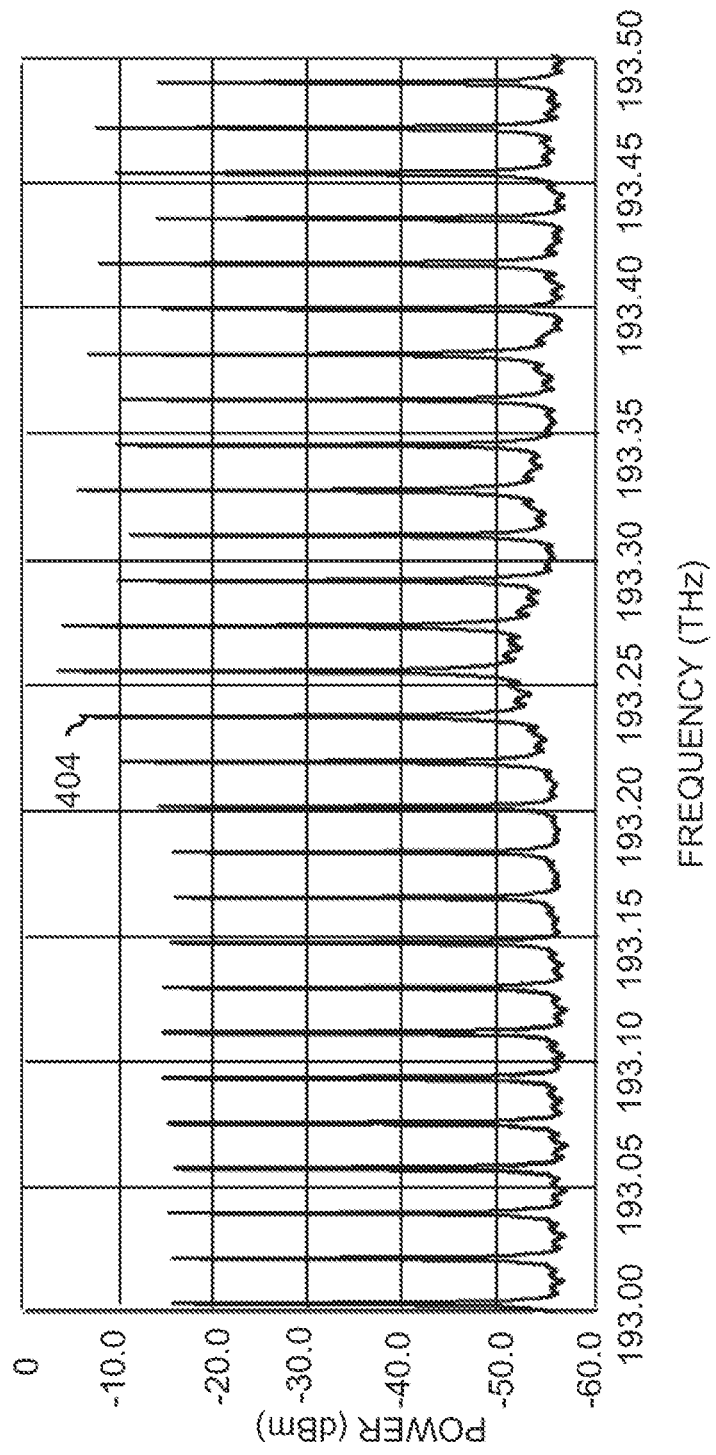

Referring now to FIGS. 4A-5B a graph 400 and a graph 500 are described, in accordance with one or more embodiments of the present disclosure. The graph 400 depicts the PM OFC 212 using the experimental parameters described above for the system 300. The graph 500 depicts the non-PM OFC in accordance with the prior art. The graph 400 and the graph 500 both depict an optical spectrum between 192 THz and 195 THz. As depicted, the system 200 and/or the system 300 may generate a similar optical frequency comb to the prior art. Additionally, the optical frequency comb generated by the system 200 and/or the system 300 may be polarization maintaining (PM) without the use of polarization maintaining HNLF. FIG. 4B further depicts a portion 402 of the graph 400 between 193 THz and 193.5 THz. FIG. 5B further depicts a portion 502 of the graph 500 between 193 THz and 193.5 THz.

The graphs 400 and the graphs 500 may each include a plurality of tones 404 which form an optical frequency comb. The power of the tones 404 are represented in dBm. The tones 404 may each be separated from adjacent tones by a fixed frequency. Each of the tones 404 may be continuous wave (CW) carriers. The carriers may each include information which is modulated onto the carriers.

Figure 6:
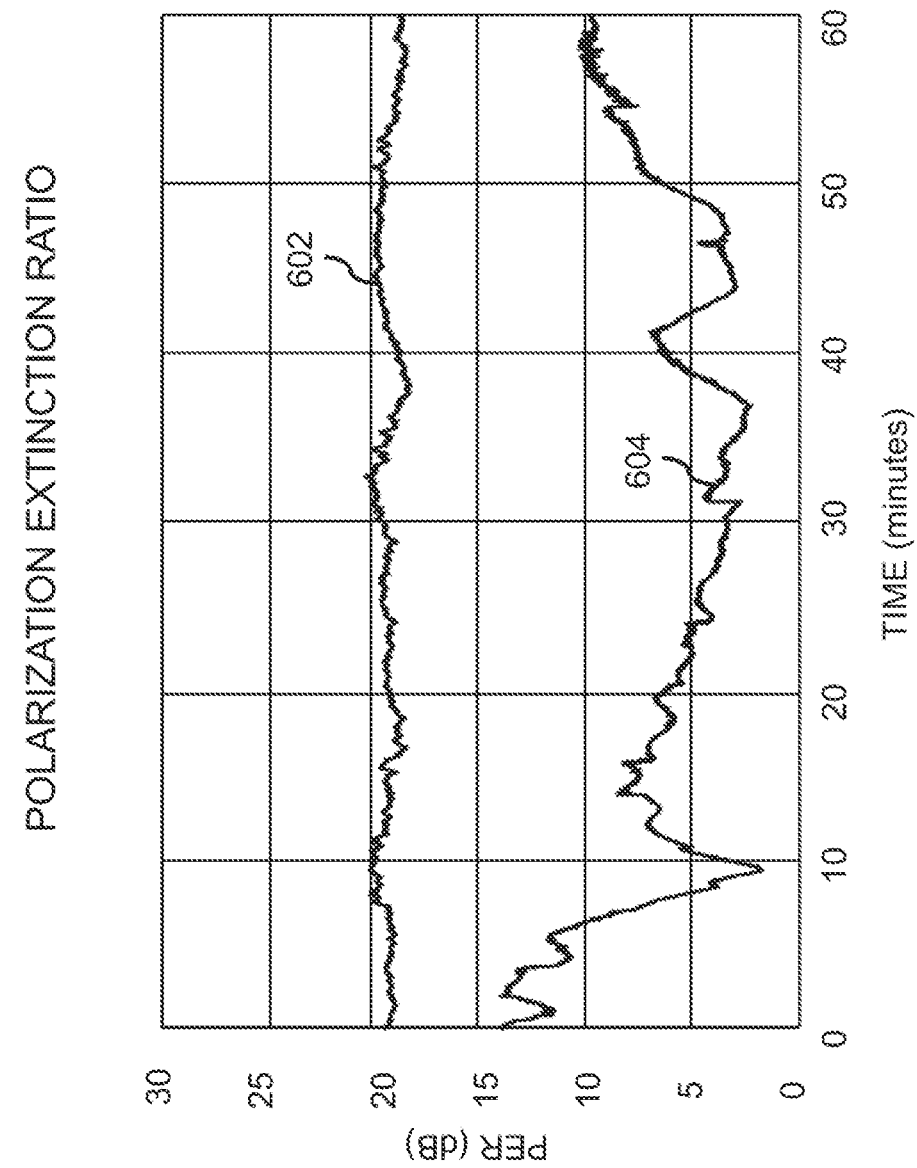
FIG. 6 depicts a graph of a polarization extinction ratio, in accordance with one or more embodiments of the present disclosure.

Referring now to FIG. 6, a graph 600 is described, in accordance with one or more embodiments of the present disclosure. The graph 600 depicts measured polarization extinction ratio 602 and measured polarization extinction ratio 604 as a function of time. A polarization extinction ratio (PER) refers to the ratio of power in a desired polarization to that in the undesired polarization. Higher polarization extinction ratios are desired. The polarization extinction ratio 602 is the PER found using the experimental parameters described above for the system 300. The polarization extinction ratio 604 is the PER found using the prior art with the non-polarization maintaining optical frequency comb.

During measurement, the polarization traveling in HNLFs and SMFs may be perturbed by environment. The polarization extinction ratio 604 changes dramatically due to environmental effects changing the state of polarization. Additionally, the polarization extinction ratio 604 is unable to achieve a PER of over 15 dB.

The system 200 and/or the system 300 may exhibit an improved polarization extinction ratio due to the backward propagation of light through the HNLF 206 and the SMF 208 after reflecting from the FRM 210 as compared to the system 100. In particular, the system 200 and/or the system 300 may exhibit the PER 602 which is relatively stable. In some embodiments, the PM OFC 212 may include a frequency range of between 192 THz and 195 THz. The PM OFC 212 may include the polarization extinction ratio 602 of at least 18 dB across the frequency range between 192 THz and 195 THz. As depicted, the polarization extinction ratio 602 of at least 18 dB across the frequency range is maintained for at least one hour. The PER 602 is also depicted as being over 20 dB during measurement.

Figure 7:
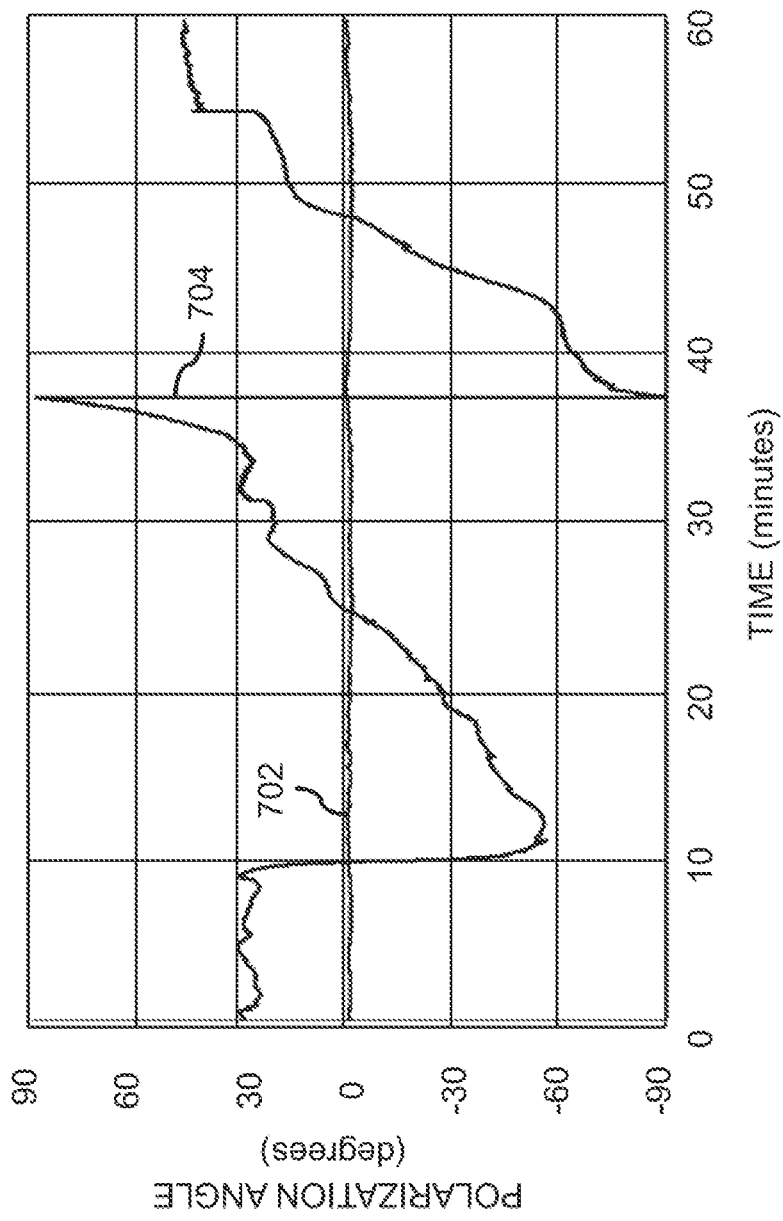
FIG. 7 depicts a graph of a polarization angle, in accordance with one or more embodiments of the present disclosure.

Referring now to FIG. 7, a graph 700 is described, in accordance with one or more embodiments of the present disclosure. The graph 700 depicts a polarization angle 702 and a polarization angle 704 as a function of time. A polarization angle may be measured in degrees. The polarization angle may refer to angle of polarization of the optical frequency comb output. Maintaining the polarization angle at a stable angle is desired, and may be referred to as a polarization maintaining optical frequency comb (PM OFC). For example, maintaining a polarization angle of zero may be desired. The polarization angle 702 may indicate the polarization angle of the optical frequency comb measured from the experimental parameters of the system 300. The polarization angle 704 may indicate the polarization angle of the optical frequency comb measured from the prior art system.

The polarization angle 704 includes a polarization angle of around 30 degrees for the first ten minutes. The polarization angle 704 then changes to around −30 degrees after ten minutes, increasing to a peak of around 90 degrees at around 38 minutes. The polarization angle 704 then changes to −90 degrees at around 38 minutes, increasing to a peak of around 45 degrees at 60 minutes. The polarization angle 704 thus changes over time and is unable to be maintained at zero degrees (or any other polarization angle). In this regard, the optical frequency comb measured from the prior art system may be considered non-polarization maintaining.

In contrast, the polarization angle 702 remains consistently at or near zero degrees (e.g., within one degree of zero) for the entire duration. In this regard, the optical frequency comb 212 measured from the system 300 may be considered polarization maintaining when maintained at a polarization angle of at or near zero degrees.

Figure 8:
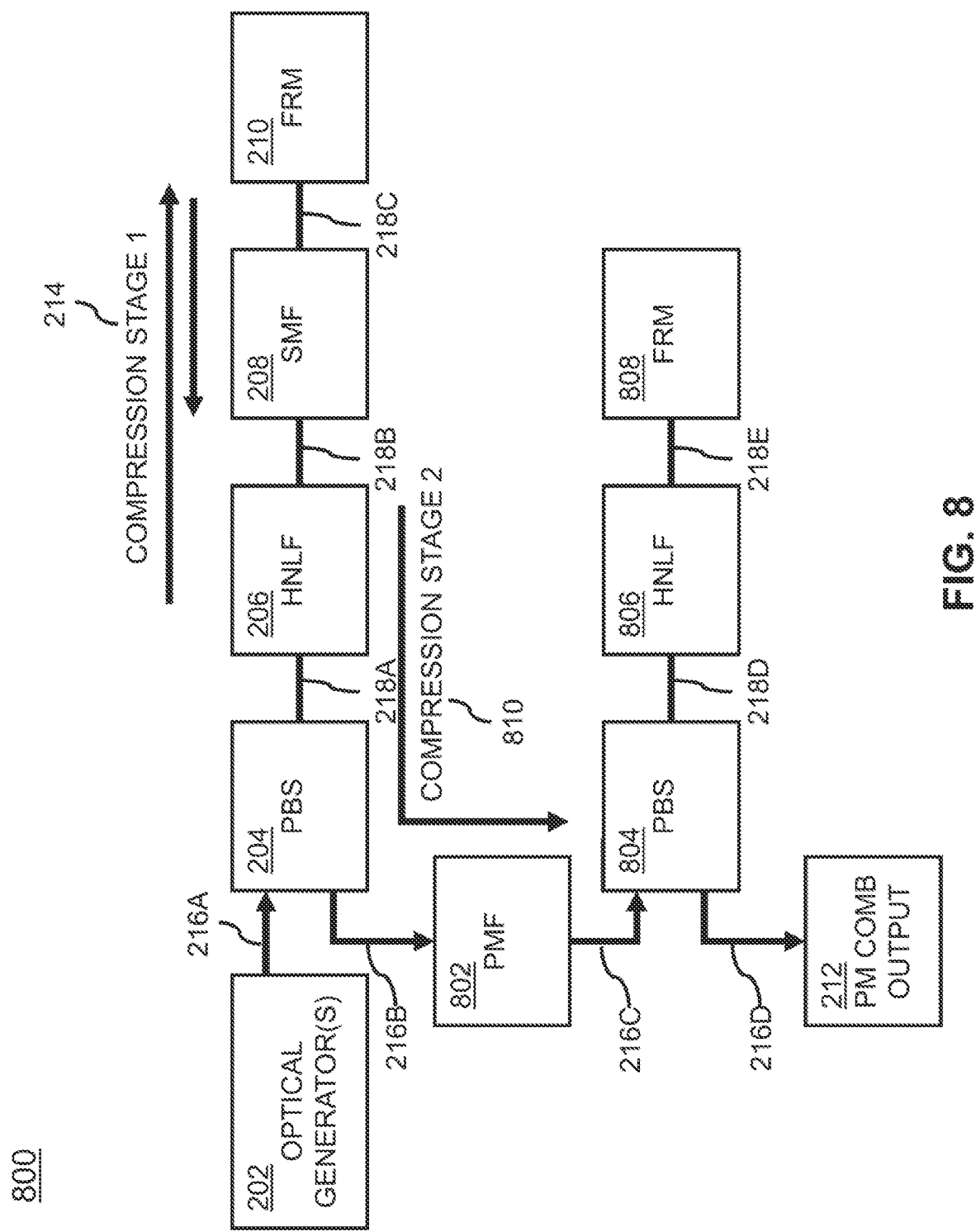
FIG. 8 depicts a simplified block diagram of a system, in accordance with one or more embodiments of the present disclosure.
Figure 9:
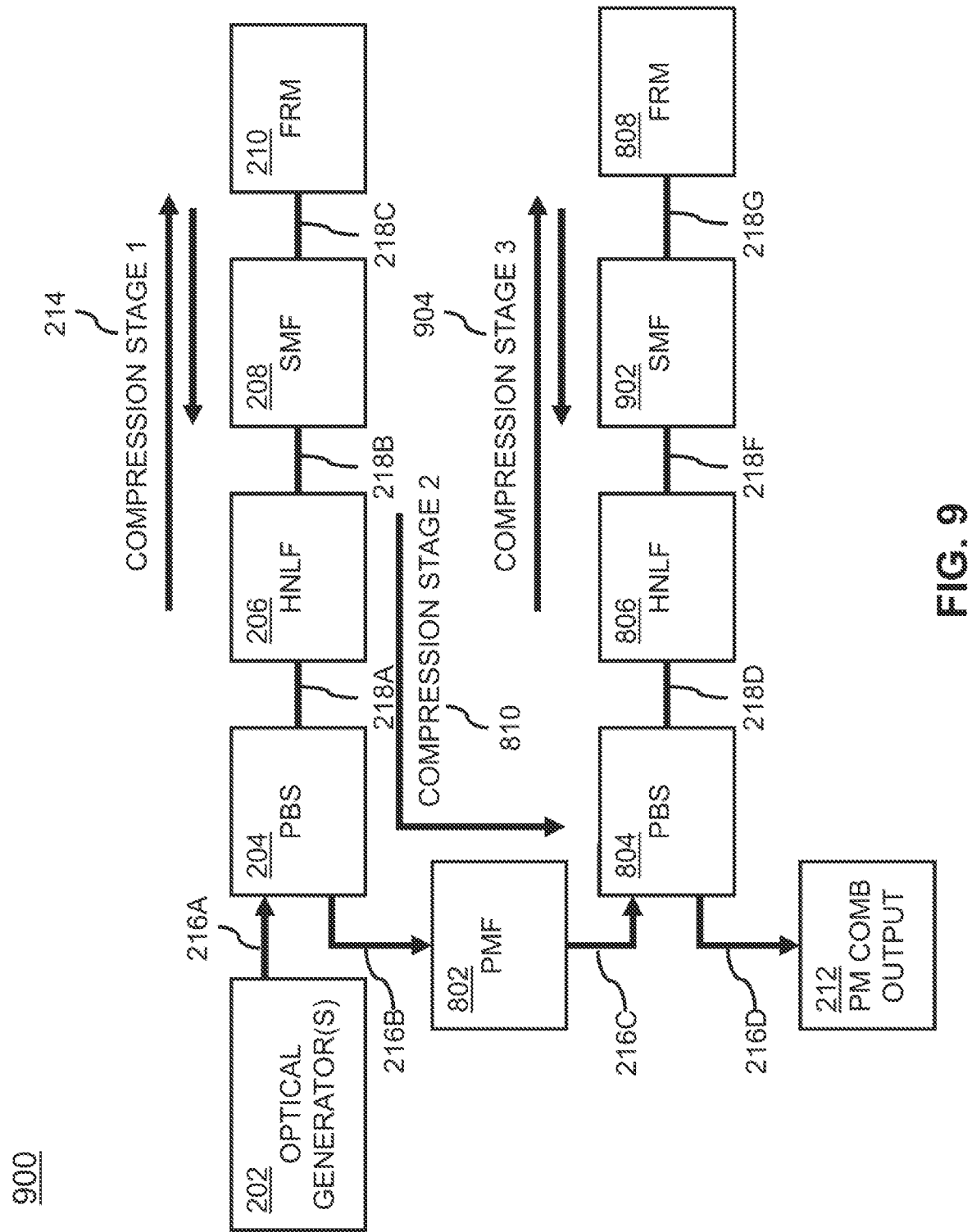
FIG. 9 depicts a simplified block diagram of a system, in accordance with one or more embodiments of the present disclosure.

Referring generally to FIGS. 8-9, the system 200 is described with one or more additional compression stages. The additional compression stages may be advantageous to further compress the polarization maintaining optical frequency comb 212.

Referring now to FIG. 8, a system 800 is described, in accordance with one or more embodiments of the present disclosure. The system 800 may be similar to the system 200. The system 800 may include one or more of the optical generators 202, the PBS 204, the HNLF 206, the SMF 208, the FRM 210, a polarization maintaining fiber 802, a PBS 804, an HNLF 806, and a FRM 808.

The PM fiber 802 may be coupled to one of the ports of the PBS 204. The polarization maintaining fiber 802 may then receive the light from the PBS 204. For example, the PM fiber 802 may be coupled to the third port of the PBS 204. The PM fiber 802 may be coupled to the third port of the PBS 204 by the PM fiber 216B. Polarization maintaining fiber may refer to fiber which maintains a polarization of light from the input to the output of the fiber. The PM fiber 802 may also be coupled to one of the ports of the PBS 804. For example, the PM fiber 802 may be coupled to a first port of the PBS 804. The PM fiber 802 may be coupled to the first port of the PBS 804 by a PM fiber 216C. The PM fiber 802 may then pass the light to the PBS 804.

The polarization maintaining fiber 802 may include a dispersion value. The dispersion value may also be referred to as a chromatic dispersion value. The PM fiber 802 may then disperse the light based on the dispersion value. The dispersion of the light may cause the duration of the frequency chirps introduced by the HNLF 206 to be reduced. In embodiments, the propagation of light through the PM fiber 802 may be considered a second compression stage 810. The dispersion value of the PM fiber 802 may be relatively high when compared to the HNLF 206. The PM fiber 802 may include a range of dispersion values, such as, but not limited to, between 18 and 22 ps/(nm*km) at 1550 nm. The length of the PM fiber 802 may be based on the power and nonlinearity in the first compression stage 214. The length of PM fiber 802 may be substantially shorter than the length of the SMF 208. For example, the length of PM fiber 802 may be between 5 and 6 meters.

The discussion of the PBS 204 is incorporated herein by reference to the PBS 804. The PBS 804 may split the polarization so the vertical polarization comes out one fiber and the horizontal polarization comes out another fiber. The PBS 804 may include three ports. A first port of the PBS 804 may be coupled to the PM fiber 802 (e.g., by the PM fiber 216C) for receiving light. A second port of the PBS 804 may be coupled to the HNLF 806. The second port of the PBS 804 may be coupled to the HNLF 806 for outputting the light to the HNLF 806. The second port of the PBS 804 may then receive backward propagation of the light reflected from the FRM 808 by the coupling with the HNLF 806. The second port of the PBS 804 may be coupled to the HNLF 806 by a SMF 218D. A third port of the PBS 804 may provide an output of a PM OFC 212 to one or more additional devices or fibers (not depicted). The third port of the PBS 804 may be coupled to the additional device or fibers by the PM fiber 216D.

The discussion of the HNLF 206 is incorporated herein by reference to the HNLF 806. The HNLF 806 may be coupled to the PBS 804 and/or the FRM 808. As depicted, the HNLF 806 is coupled between the PBS 804 and the FRM 808. The HNLF 806 may be coupled to the PBS 804 by the SMF 218D. The HNLF 806 may be coupled to the FRM 808 by the SMF 218E. The HNLF 806 may receive light from the PBS 804 and pass the light to the FRM 808 in forward propagation. Similarly, the HNLF 806 may receive light reflected from the FRM 808 and pass the light to the PBS 804 in backward propagation.

In some embodiments, the HNLF 806 may be single mode HNLF. The single mode HNLF 806 may be non-polarization maintaining. The HNLF 806 may then induce self-phase modulation or a frequency chirp into the light passing through the HNLF 806. The self-phase modulation or frequency chirp may be based on the amount of power and/or the length of the HNLF 806.

The discussion of the FRM 210 is incorporated herein by reference to the FRM 808. The FRM 808 may be coupled to the HNLF 806 to maintain polarization after light forward and backward propagates through the HNLF 806. In one example, the PBS 204 may receive light having a vertical polarization from the optical generator 202. The light may reflect from the FRM 210 back to the PBS 204 and now be in horizontal polarization. The PMF 802 may compress the light and then pass the light with the horizontal polarization to the PBS 804. The PBS 804 may receive the light with the horizontal polarization. The light may reflect from the FRM 210 back to the PBS 804 and now be in vertical polarization. In this example, the PM OFC 212 output by the third port of the PBS 804 may include the vertical polarization.

Referring now to FIG. 9, a system 900 is described, in accordance with one or more embodiments of the present disclosure. The system 900 may be similar to the system 200 and/or the system 800. The system 900 may include one or more of the optical generators 202, the PBS 204, the HNLF 206, the SMF 208, the FRM 210, the polarization maintaining fiber 802, the PBS 804, the HNLF 806, the FRM 808, and an SMF 902.

The discussion of the SMF 208 is incorporated herein by reference to the SMF 902. The SMF 902 may be coupled to the HNLF 906 and/or the FRM 808. As depicted, the SMF 902 is coupled between the HNLF 806 and the FRM 808. The SMF 902 may be coupled to the HNLF 806 by the SMF 218F. The SMF 902 may be coupled to the FRM 808 by the SMF 218G. The SMF 902 may receive light from the HNLF 806 and pass the light to the FRM 808 in forward propagation. Similarly, the SMF 902 may receive light from the FRM 808 and pass the light to the HNLF 806 in backward propagation after the light reflects from the FRM 808.

The SMF 902 may include a dispersion value. The SMF 902 may then disperse the light based on the dispersion value. The dispersion of the light may cause the duration of the frequency chirps introduced by the HNLF 806 to be reduced. The SMF 902 may include a range of dispersion values, such as, but not limited to, between 18 and 22 ps/(nm*km) at 1550 nm.

In embodiments, the forward propagation of light through the HNLF 806, the forward propagation of light through the SMF 902, and the backward propagation of light through the SMF 902 may be considered a third compression stage 904. In this regard, the SMF 902 may be added to the system 900 to do an extra compression on the pulse. The backward propagation through the HNLF 806 may then generate the comb. A high peak power may be needed to generate the comb. The third compression stage 904 may generate a high peak power pulse. The high peak power pulse may cause a much higher nonlinearity effect in the HNLF 806. The nonlinearity may generate the PM OFC 212.

The HNLF 206 may also generate the PM OFC 212 in backward propagation and output the PM OFC 212 from the third port of the PBS 204 (see FIG. 2). However, the PM OFC 212 generated by the HNLF 206 may not be as efficient as the PM OFC 212 generated by the HNLF 806 because the pulse is not as narrow or high power therefore the nonlinearities are not as strong. In this regard, the second compression stage 810 and/or the third compression stage 904 may be added to achieve a desired nonlinearity or the desired OFC properties.

Although not depicted, the system 900 may further include any number of compression stages in addition to the first compression stage 214, the second compression stage 810, and the third compression stage 904. For example, the system 900 may include a fourth compression stage coupled to the third output port of the PBS 804 and may include PMF similar to the PMF 802. The fourth compression stage may then be coupled to a PBS, HNLF, and FRM for generating the PM OFC 212. The PBS, HNLF, and FRM after the fourth compression stage may be in a configuration similar to FIG. 8 with the PBS 804, the HNLF 806, and the FRM 808. By way of another example, the system 900 may include a fourth compression stage coupled to the third output port of the PBS 804 and a fifth compression stage coupled to the fourth compression stage. The fourth compression stage may include a PMF similar to the PMF 802. The fifth compression stage may include a PBS, HNLF, SMF, and FRM for compression and generating the PM OFC 212. The PBS, HNLF, SMF, and FRM after the fourth compression stage may be in a configuration similar to FIG. 9 with the PBS 804, the HNLF 806, the SMF 902, and the FRM 808 after the PMF 802. Thus, the concepts of the second compression stage 810 and/or the third compression stage 904 may be repeated for a compression stage of a fourth, fifth, or higher order.

Referring generally again to FIGS. 1-9.

As may be understood, any of the various components may be coupled by one or more connectors. The various connectors may include any suitable optical fiber connectors to join optical fibers, such as, but not limited to, pigtails, patch cords, and the like. The various connectors are not depicted in the interest of clarity. Additionally, any of the various components may be coupled by optical fiber fusion splicing, butt coupling, or positioning using free space optics.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented. It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. A system comprising:
   an optical generator configured to generate light, wherein the light comprises a first polarization, wherein the first polarization is one of a vertical polarization or a horizontal polarization;
   a first polarization beam splitter (PBS) coupled to the optical generator;
   a first highly nonlinear fiber (HNLF) coupled to the first PBS, wherein the first HNLF induces self-phase modulation to the light;
   a first single mode fiber coupled to the first HNLF, wherein the first single mode fiber causes pulse compression of the light; and
   a first faraday rotator mirror (FRM) coupled to the first single mode fiber;
   wherein the first HNLF and the first single mode fiber are non-polarization maintaining fiber;
   wherein the light is configured to forward propagate from the first PBS through the first HNLF and the first single mode fiber, reflect from the first FRM, and back propagate through the first single mode fiber and the first HNLF to the first PBS;
   wherein the first FRM causes a polarization of the light immediately after reflecting from the first FRM to be orthogonal to a polarization of the light immediately before reflecting from the first FRM;
   wherein the first PBS is configured to output an optical frequency comb, wherein the optical frequency comb is polarization maintaining.

2. The system of claim 1, wherein the optical frequency comb comprises a plurality of optical continuous wave carriers.

3. The system of claim 1, wherein the optical frequency comb is polarization maintaining without a polarization controller.

4. The system of claim 1, wherein a perturbation in a state of polarization caused by the first HNLF and the first single mode fiber is cancelled between a forward propagation from the first PBS to the first FRM and a backward propagation from the first FRM to the first PBS.

5. The system of claim 1, wherein the optical frequency comb comprises a frequency range between 150 THz and 375 THz.

6. The system of claim 1, wherein a length of the first HNLF is between 50 meters and 150 meters.

7. The system of claim 1, wherein a length of the first single mode fiber is between 150 meters and 300 meters.

8. The system of claim 1, wherein the polarization maintaining optical frequency comb comprises a frequency range between 192 THz and 195 THz, wherein the polarization maintaining optical frequency comb comprises a polarization extinction ratio of at least 18 dB across the frequency range.

9. The system of claim 8, wherein the polarization extinction ratio of at least 18 dB across the frequency range is maintained for at least one hour.

10. The system of claim 1, wherein the first PBS is configured to output the optical frequency comb, wherein a polarization of the optical frequency comb is orthogonal to the first polarization.

11. The system of claim 1, comprising at least two compression stages.

12. The system of claim 11, comprising:
    a polarization maintaining fiber coupled to the first PBS;
    a second PBS coupled to the polarization maintaining fiber;

a second HNLF coupled to the second PBS, wherein the second HNLF introduces self-phase modulation to the light; and a second FRM coupled to the second HNLF;

wherein the light is configured to forward propagate from the second PBS through the second HNLF, reflect from the second FRM, and back propagate through the second HNLF to the second PBS;

wherein the second FRM causes a polarization of the light immediately after reflecting from the second FRM to be orthogonal to a polarization of the light immediately before reflecting from the second FRM;

wherein the second PBS is configured to output the optical frequency comb, wherein a polarization of the optical frequency comb is the first polarization.

13. The system of claim 11, comprising:

a polarization maintaining fiber coupled to the first PBS;

a second PBS coupled to the polarization maintaining fiber;

a second HNLF coupled to the second PBS, wherein the second HNLF introduces self-phase modulation to the light;

a second single mode fiber coupled to the second HNLF; and a second FRM coupled to the second HNLF;

wherein the light is configured to forward propagate from the second PBS through the second HNLF and the second single mode fiber, reflect from the second FRM, and back propagate through the second single mode fiber and the second HNLF to the second PBS;

wherein the second FRM causes a polarization of the light immediately before reflecting from the second FRM to be orthogonal to a polarization of the light immediately after reflecting from the second FRM;

wherein the second PBS is configured to output the optical frequency comb, wherein a polarization of the optical frequency comb is the first polarization.

14. The system of claim 13, comprising at least four compression stages.

15. The system of claim 1, wherein the PBS comprises a polarization maintaining to single mode fused fiber polarization combiner.

16. The system of claim 1, wherein the first HNLF is single mode.

17. The system of claim 1, wherein the optical generator comprises a radio-frequency signal generator, a radio-frequency amplifier, a tunable laser, a phase modulator, and a polarization maintaining optical amplifier.

18. The system of claim 1, wherein the optical generator comprises at least two optical wavelengths that have a fixed difference frequency.

* * * * *